United States Patent [19]

Zacharias

[11] Patent Number: 4,605,829
[45] Date of Patent: Aug. 12, 1986

[54] MEASURING THE LOAD ON LIFTING EQUIPMENT

[75] Inventor: Karl Zacharias, Schwerte, Fed. Rep. of Germany

[73] Assignee: Mannesmann Aktiengesselschaft, Duesseldorf, Fed. Rep. of Germany

[21] Appl. No.: 625,448

[22] Filed: Jun. 27, 1984

[30] Foreign Application Priority Data

Jul. 1, 1983 [DE] Fed. Rep. of Germany ....... 3323662

[51] Int. Cl.⁴ .............................................. H01H 3/02
[52] U.S. Cl. ............................... 200/52 R; 73/862.62; 200/85 R
[58] Field of Search .......................... 200/52 R, 85 R; 340/685; 73/862.62, 862.64, 862.65

[56] References Cited

U.S. PATENT DOCUMENTS

| | | | |
|---|---|---|---|
| 2,453,550 | 11/1948 | Statham | 338/199 X |
| 2,462,041 | 2/1949 | Hohler | 200/85 R |
| 2,512,055 | 6/1950 | Dillon | 200/85 R |
| 3,976,851 | 8/1976 | Redon | 200/85 R |
| 4,283,942 | 8/1971 | Fishfader | 72/862.65 |

Primary Examiner—A. D. Pellinen
Assistant Examiner—Morris Ginsburg
Attorney, Agent, or Firm—Ralf H. Siegemund

[57] ABSTRACT

The measuring device is constructed as an oval chain link which upon experiencing load will tend to lengthen so that its long sides move closer to each other; switching devices or other proximity sensing devices respond to this approach to signal, for example, overload.

16 Claims, 11 Drawing Figures

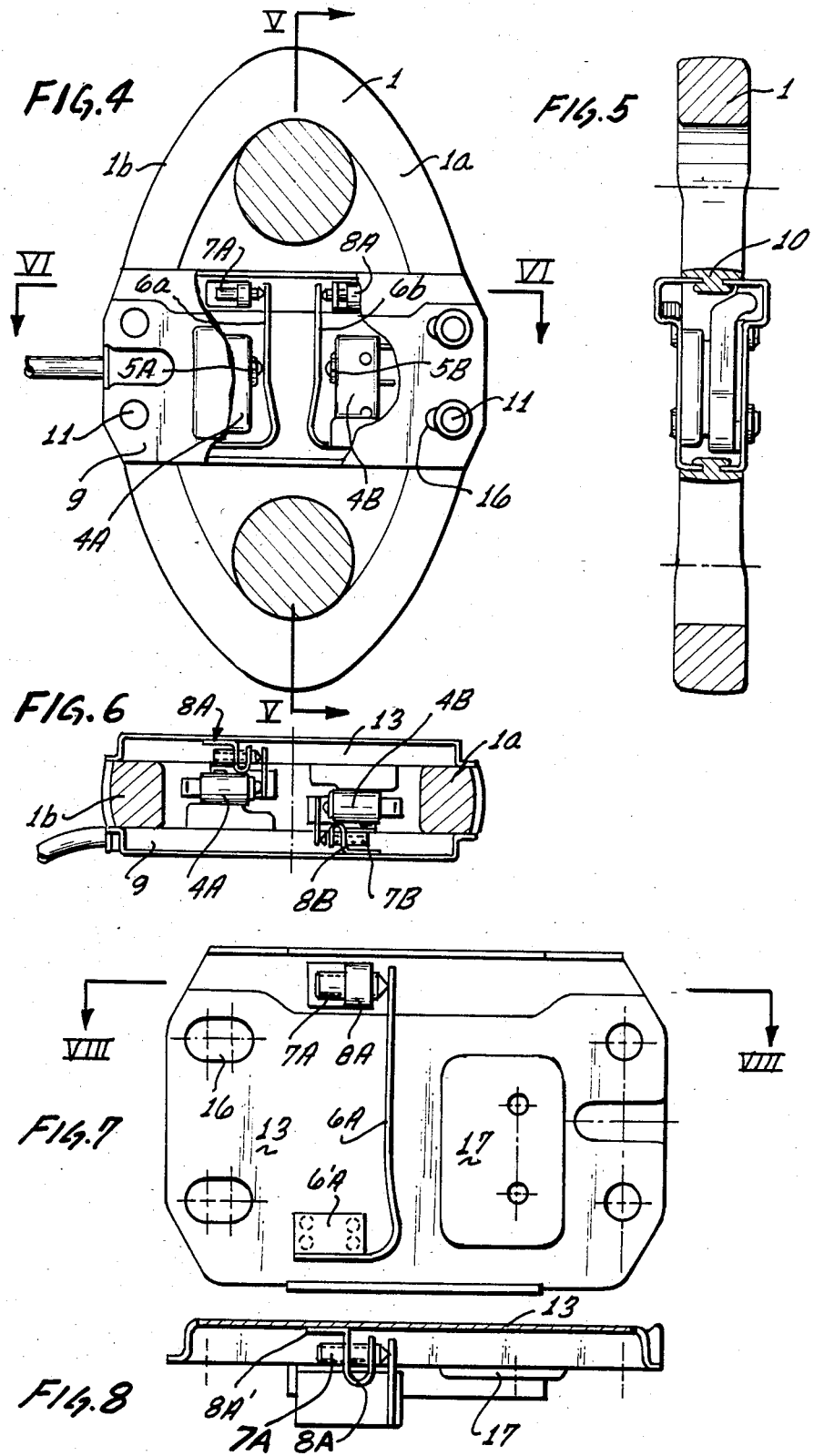

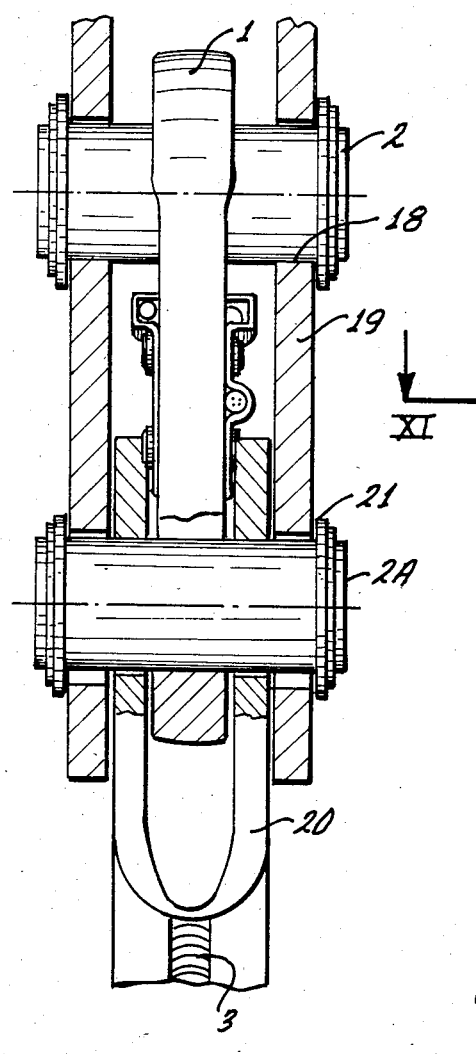
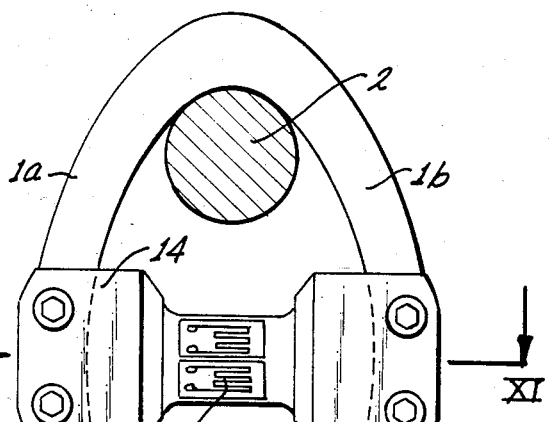
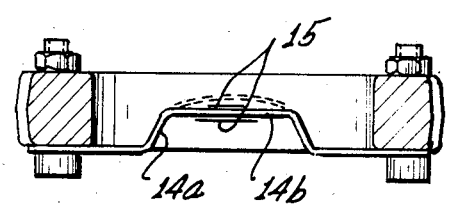

MEASURING THE LOAD ON LIFTING EQUIPMENT

BACKGROUND OF THE INVENTION

The present invention relates to measuring loads for lifting equipment under utilization of a measuring transducer, or the like, to which structure is connected for receiving a load.

German printed patent application No. 2,639,762 describes a load-measuring facility of the type to which the invention pertains generally, wherein this particular equipment is just provided as an indicator for the existing load, or it serves as a monitoring device in order to prevent overload conditions; that is to say in case of an impending overload the lifting motor is turned off. The structure as disclosed in this particular reference is basically comprised of a flat piece with a narrowing taper in between end bores to which tension measuring strips, i.e., strips of a tension sensitive material is provided, and measuring indications are derived therefrom. The device disclosed in this particular publication is quite suitable for its intended purpose, and particularly it covers a wide range of loads. However, the device is quite expensive.

DESCRIPTION OF THE INVENTION

It is an object of the present invention to provide a simplified device for measuring loads on lifting equipment.

It is a particular object of the present invention to provide a new and improved measuring structure for measuring loads in lifting equipment, the structure is to have relatively small dimensions.

In accordance with the preferred embodiment of the present invention, it is suggested to provide the measuring instrument as a member or link of a chain having longitudinal sides and between these longitudinal sides a deformation sensitive device is arranged. The measuring structure as suggested is not longer than a regular member of a chain, and can be made in a very inexpensive manner. Preferably, it has an oval contour, whereby the ratio between the inner width to the inner height on account of the ovality is in the range of 1:1.8 to 1:2.5. The spring or displacement path between the longitudinal sides of this oval structure is for rated load about 0.8 millimeters. This relatively large spring and displacement path permits a deformation sensing device to be placed directly in between. This deformation sensing device may be, for example, a switching element which can be operated directly by the lifting stroke of the resilient (i.e., reversible) displacement path as defined without requiring interpositioning of a path amplifying lever structure or the like.

The principle employed is directly responsible for a very high degree of repeatability of a once adjusted structure. Tests have shown that even after four million switching cycles, the device is still operative and reliable. The switching element itself is affixed to one longitudinal side of the chain link, and it is provided with a movable plunger abutting the other long side of the link to be actuated therewith. Preferably, there is a projection at that longitudinal link portion being oriented in inward direction.

In accordance with a further feature of the invention, the deformation sensing device, i.e., a switching element is provided with an adjusting feature in that the switching element itself is maintained in between two adjusting screws. Nuts are arranged for these screws inside a biparted casing for ease of assembly, the partitioning being bridged by a separating and sealing bar.

It should be noted that the inventive concept is not limited to the employment of a single switching element, but one can provide several of them and adjust them to different responses as far as loads are concerned, whereby miniaturization seems to be desirable. The aforementioned biparted casing may be screwed to one of the longitudinal sides of the chain element.

In furtherance of the invention and as an alternative realization, longitudinal sides of a chain link may be interconnected through a bar or the like, on which tension measuring strips are provided. The bar is tensioned as the chain link is under load, and the tension is measured by the tension strips in a manner known per se to be used an electrical signal, for example, for control of the lifting device to which the chain pertains. The bar may be provided with bendup portions and a platform situated in between the fastening points on oppositely situated longitudinally sides in the interior of the chain link member. The tension measuring strips will be arranged on the platform and on opposite sides of the bar, and are interconnected in bridge-like fashion.

In an alternative embodiment, two switching elements with different points of response and switching may be fastened to the aformentioned housing or casing portions in an opposing fashion facing each other. The casing portions may be affixed to different longitudinal sides of the chain member while being guided through oblong slots and and adjusting screws with respect to the opposite longitudinal side of the member. The switching elements will be fastened to opposite casing parts. Actuating stops or arms are arranged centrally within the chain link element, which arms are connected with one end to the casing part to which the associated switch is not connected, and they bear with their respective other ends resiliently against an adjusting screw which is passed through a nut being affixed to the same casing part to which the arm is connected. The nut should be a resilient, self-locking nut. Each casing part is provided on one side of a longitudinal plane of symmetry of the chain link with such an actuating element, and on the other side of this plane there is a seating or mounting surface for the other switch element.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 4 is a side view of a measuring device still constituting a preferred embodiment, but incorporating two switching elements;

FIG. 5 is a section view taken in the plane V—V as indicated in FIG. 4;

FIG. 6 is a section taken in the plane indicated by VI—VI as indicated in FIG. 4;

FIG. 7 shows a detailed housing portion of the device shown in FIG. 4, but in an enlarged scale;

FIG. 8 is a section as indicated by VIII—VIII in FIG. 7;

FIG. 9 illustrates the measuring device as per FIG. 4, but during installations;

FIG. 10 is another example for practicing the invention in accordance with the preferred embodiment; and FIG. 11 is a section as indicated by XI—XI in FIG. 10.

Figure 1:
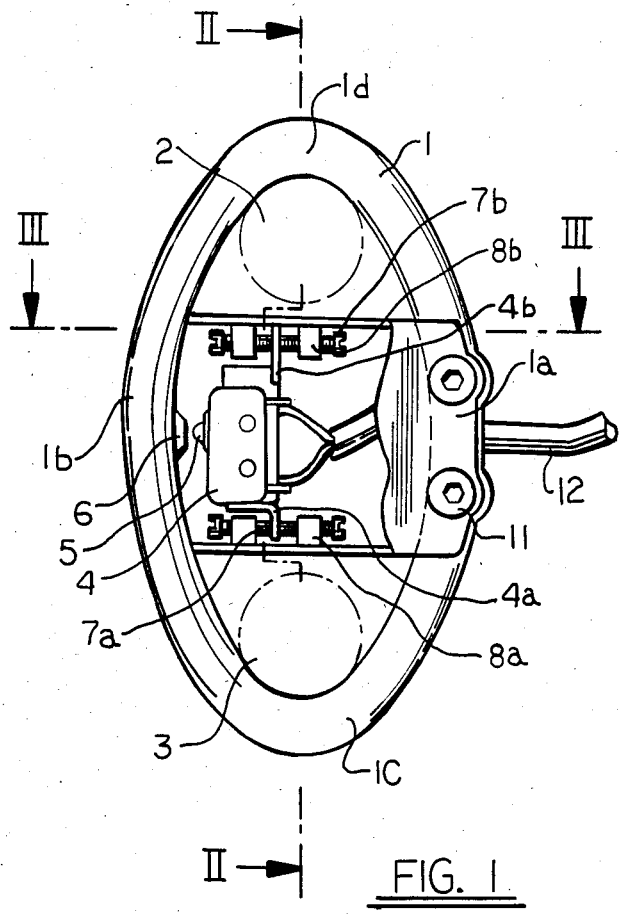
FIG. 1 is a side view of a measuring device in accordance with the preferred embodiment of the present invention for practicing the best mode thereof.

Proceeding now to the detailed description of the drawings, the figures show a generally oval or elliptical element 1 which is constructed as a chain link. In fact available chain links of this kind may be used provided the material is strong enough for the intended purpose. The link 1 is suspended by means of bolt 2 or the like from a lifting and hoisting structure and device, which is not illustrated but provides for lifting and lowering action. The element 2 could be also a link in a chain. In the lower portion of FIG. 1 is shown a structure 3 which pertains to the load carrying part of the lifting equipment. 3 therefore could be an eye, a loop part of a shackle, or the like, by means of which a load can be suspended and lifted. It is therefore apparent that the effective load as transmitted from the load proper on device 3 to the lifting facility that is connected to device 2, is directly transmitted by and through the chain link element 1.

Figure 2:
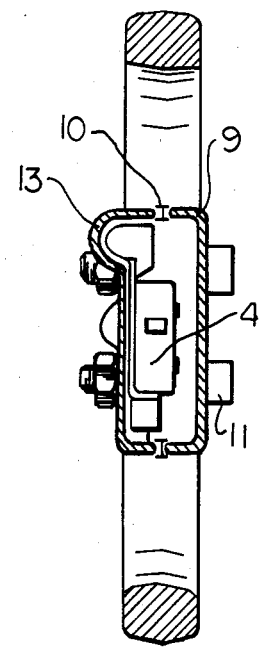
FIG. 2 is a section view taken in the plane II—II in FIG. 1.
Figure 3:
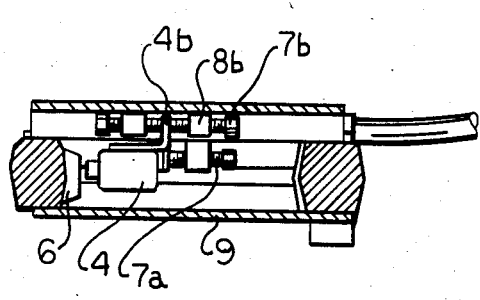
FIG. 3 is a section view as indicated by line III—III in FIG. 1.

The chain link 1 has long sides so to speak 1a and 1b, and short curved portions 1c and 1d. The inner contour of the chain link 1 defines an ellipse in which the long axis is not quite double the short axis. This is within the above identified range. A switching element 4 is disposed centrally between the two long sides 1a and 1b. The switching element 4 is actually contained in a biparted housing having halves or portions 9 and 13. The plane in which the oval or elliptical contour extends is a plane of symmetry, and is also a plane for partitioning of the housing as can be seen from FIG. 2, such plane of symmetry extends transversely in a vertical direction to the plane of the drawing of FIG. 2.

It is assumed that the switching element 4 is a microtype switching device with a switching plunger 5 bearing against a projection 6 from the side 1b. The plunger 5 may be normally disengaged from the projection 6, and may remain disengaged under normal loads. As tension is applied to the chain link 1, such tension will tend to lengthen the link 1, thereby causing the two sides 1a and 1b to approach each other for actuating the switch.

The housing 9-13 is affixed by means of screws to the length side 1a, and as stated the switching element 4 is mounted to that housing. Therefore, the position of the switch 4 is a fixed one in relation to the side 1a. Accordingly, as load is applied, the side 1b will tend to move towards the plunger 5, but the switch 4 will tend to move towards the side 1b because it is affixed to said 1a. Depending upon the conditions of adjustment, the switch will be operated in that the projection 6 pushes the plunger 5 inwardly to obtain switching action.

In order to adjust the load under which the switching action occurs, it must be taken into consideration that the lengthening of the chain link and the approach of its two sides 1a and 1b towards each other depend on the load conditions and define therefore the available switching path. The adjustment for the switching action towards a particular load condition is carried out by means of adjusting screws 7a and 7b by means of which the switch 4 is actually mounted to the housing 9 and 13. These screws carry side bars 4a and 4b of switch 4 and are in fact threadedly received by nuts 8a and 8b. These nuts 8a, b are affixed to the housing. Therefore, as the screws are turned the switch 4 will be adjusted to and through, depending on the direction of adjustment in relation to the housing, as well as in relation to the chain link side 1a, which is turn means that the position of the tip of plunger 5 is adjusted with respect to the projection 6.

As stated, the housing carrying the switch 4 in the manner described is constructed in a biparted fashion, but is closed by means of a bar 10 after assembly. This then facilitates the mounting of the switch, but the sealing bar or ridge element 10 makes sure that the housing is in fact closed. Reference numeral 12 refers to the electrical connection which leads from the switch 4 to the outside and ultimately to the control circuit for the motor of the lifting device.

Turning now to FIG. 4, the Figure illustrates basically a similar chain link element 1, but being provided in this case with two switching elements 4A and 4B. The switching element 4A bears against a rod shaped actuating element 6A, being of a resilient configuration. Analogously, the actuating plunger 5B of this switching element 4B bears against an actuating arm 6B.

It may be assumed, for example, that the link element 1 will deform along the short axis of the ellipse by 0.2 mm for 20% rated load. The switch 4A may be adjusted to respond to this deformation in that actuating arm 6A will actuate plunger 5A of switch 4A, for example switch 4A may control a lifting motor from fast to precision motion, or from a high-speed mode to a low-speed mode. In case the load exceeds the rated load by 10%, the measuring chain link can be expected, for example, to be deformed from a normal configuration by 0.9 mm, i.e., the maximum spacing between the long sides of this link will be diminished by 0.9 mm. It is further assumed that under such conditions plunger 5B is actuated by the stop and actuating arm 6B, and switch 4B will accordingly respond and, for example, will cause the lifting motor to be turned off.

In order to adjust very accurately the response points, actuating arms 6A and 6B bear against adjusting screws 7A and 7B, being respectively threaded into and through resilient and self-locking nuts 8A and 8B. These nuts are affixed respectively to the wall of the biparted casing 13 and 9.

Resilient nut 8A, for example, as illustrated in greater detail in FIGS. 7 and 8, is basically a flat profile suitably bent and having a leg 8A' for connection to casing part 13. The nut 8B is correspondingly affixed to casing part 9.

In each instance the nuts have a U-shaped portion, the legs are traversed by threaded apertures, and the U-shaped configuration makes sure that the threading of the respective adjusting screws 7A or 7B causes the disposition of the U to act in the self-locking manner and resiliently reacting for locking the screw nut as can be seen best from FIG. 8. FIG. 8 moroever illustrates a seating surface or platform 17. This illustrated platform extends in this case from the housing path 13, and cooperates, i.e., serves as mounting facility for the switching element 4B which cooperates with the switch arm 6B, the latter being mounted on housing part 9. There is of course an analogous platform 17 for the switch 4A mounted on casing part 9, the switch 4A cooperating with the arm 6A that is mounted on casing 13.

FIG. 7 also illustrates oblong slots 16 in casing part 13, which permit extension of the measuring piece 1 in longitudinal direction. Casing part 9 has likewise such oblong slots. Thus, one casing part is fixed to one long arm of the chain link member, but can move relative to the other one. The situation is reversed as to the other casing part. The change in distance between the longitudinal sides 1a and 1b of the chain link element 1 should not interfere with the mounting per se of the various parts. On the other hand, the vehicle motion of casing parts 9 and 13 parallel to each other represents the chain member deformation to be sensed. In case the actuating path of one of the plungers is exceeded, it can readily be seen that the respective stop arm 6A or 6B will yield resiliently, but later when the load has diminished it will assume the original disposition. FIG. 7 shows also a mounting piece 6'A for switch actuator arm 6A.

Should for any reason the chain link 1 break, it will be necessary to make sure that the load will not tumble to the ground. This is prevented through the structure shown in FIG. 9 illustrating a cable traverse and capturing depth. As shown in FIG. 9, the link element 1 bears, via a pin 2, upon the lower edge of bores 18 in a side plate arrangement. The lower bolt 2A runs through the lower loop portion of the measuring element 1 and is provided with a cable receiving structure 20, and the lifting element 3, alluded to earlier, is fastened thereto. This lifting element 3, however, is in this case particularized to be a rope or a cable. The lower pin 2A runs through oblong slots 21 of side sheets 19. These oblong slots 21 permit free extension of the chain link, and the pin 2A running through the cable receiving structure 20 and the oblong slot 21 prevents the load from tumbling down in case the chain link element 1 breaks.

Proceeding now to the example shown in FIGS. 10 and 11, again a similar type chain link member is assumed having sides 1a and 1b. The deformation sensing device in this case is established by a bar element 14 which in the central portion of the space surrounded by the link member has inwardly oriented bend-off portions 14A. These two bend-off portions hold centrally a measuring platform 14B. Tension strips 15 are affixed to both sides of this platform. Under load, i.e., when the two sides 1A and 1B of the link member approach each other, the measuring platform 14B will be deformed and assume a slightly buckling configuration as indicated by dotted lines in FIG. 11. This then will put the tension strips underneath, i.e., on the concave part of this platform, into a compression mode, and the measuring strips on the outside or convexed part of the buckling platform will be put under tension. The strips 15 will be connected in a full bridge circuit for example, and furnish directly a signal indicative of load and possibly access load. The signals can be used for control of the lifting equipment in a manner that was described.

The invention is not limited to the embodiments described above, but all changes and modifications thereof not constituting departures from the spirit and scope of the invention are intended to be included.

I claim:

1. A device measuring a load as it is effective on a lifting facility by virtue of the suspended load comprising:

a measuring device constructed as an oval closed ring chain link element with near rectangular cross-sections and being interposed in a load transmission path between said lifting facility and said suspended load to act along a long dimension of the chain link element having two curved long sides, said long sides being interconnected transversely by plate means, being secured to one of said long sides while permitting relative movement relative to the respective other long side, said long sides tend to straighten under tension load on the chain link element; and a deformation sensing device including at least one switch mounted on said plate means to thereby being interposed between said long sides and being actuated by the other one of the long sides when said long sides approach each other under load.

2. Measuring device as in claim 1, said oval ring element having width to length ratio in the range from 1:1.8 to 1:2.5.

3. Measuring device as in claim 1 wherein said switch has an actuating plunger projecting towards the respective other long side to be actuated therefrom.

4. Device as in claim 3 wherein a projection extends towards said plunger from said other long side.

5. Device as in claim 1 wherein said deformation sensing device is adjustably mounted to said plate means to be adjustably responsive to proximity to the respective other one of the long sides.

6. Device as in claim 3 said plate means including a housing mounted to said one long side and carrying said switch.

7. Device as in claim 6, said housing including adjusting means for adjusting the proximity between the plunger and the respective other long side.

8. Device as in claim 6, said housing being biparted and sealed.

9. Device as in claim 1 wherein said deformation sensing means includes a plurality of switches adjusted to respond to different loads.

10. A device as in claim 6, and including two separate housing parts, one part carrying said switch, the other part carrying a second switch, wherein one housing part is affixed to one of the long sides, but guided through yielding fastening in relation to the other long side, and the relationship being reversed for the other housing part, and wherein each housing part carries adjustable actuating means for cooperating with the switch mounted to the respective other housing part.

11. Device as in claim 10 wherein the actuating means are respectively resilient arms cooperating with adjusting screws and being held by adjusting nuts affixed to the housing part to which the cooperating switch is not affixed.

12. Device as in claim 11 wherein the nuts are of self-locking resilient construction.

13. Device as in claim 10 wherein each of the housing parts is situated on one side of a longitudinal plane through a long axis of the oval ring element, each housing part respectively provided with one of the actuating means and on the other side with a mounting platform for the respective other switch.

14. A device measuring a load as it is effective on a lifting facility by virtue of the suspended load comprising:

a measuring device constructed as an oval, closed ring chain link element with near rectangular cross section and being interposed in a load transmission path between said lifting facility and said suspended load, the chain link element having two curved long sides which tend to straighten under tension load on the chain link element; and a platform interposed between said long sides by extending from one of the long sides to the respective other one for being responsive to said long sides approaching each other under load by bending to a variable degree in a plane transversely to a plane of the oval ring element and including at least one tension measuring strip mounted thereon.

15. Device as in claim 14 wherein said platform includes a platform portion on bend-off portions and carrying tension measuring strips.

16. Device as in claim 15 wherein said strips are mounted to both sides of said platform.

* * * * *